Patented Oct. 24, 1950

2,527,393

UNITED STATES PATENT OFFICE 2,527,393

CATALYSTS FOR PREPARATION OF SYNTHETIC RUBBER

Robert W. Brown, Naugatuck, Conn., assignor to United States Rubber Company, New York, N. Y., a corporation of New Jersey No Drawing. Original application August 27, 1948, Serial No. 46,550. Divided and this application March 15, 1949, Serial No. 81,636

15 Claims. (Cl. 260—84.3)

The present invention relates to new catalysts for the preparation of synthetic rubber latices by the aqueous emulsion polymerization of butadiene-1,3hydrocarbons and mixtures of butadiene-1,3hydrocarbons with compounds which are copolymerizable therewith.

This is a division of my co-pending application Serial No. 46,550, filed August 27, 1948, now abandoned.

I have found that unsubstituted and substituted arylazo aryl sulfones are effective catalysts, or so-called initiators, in the preparation of synthetic rubbers by aqueous emulsion polymerization of the synthetic rubber-forming monomers. These arylazo aryl sulfones are characterized by the structure Ar—N=N—SO$_2$—Ar', where Ar and Ar' are unsubstituted and substituted aryl groups.

The arylazo aryl sulfone catalysts of the present invention are faster acting than conventional peroxidic catalysts in low temperature polymerizations. They have an advantage over arylazo aryl sulfides (Ar—N=N—S—Ar', where Ar and Ar' are aryl groups), or so-called aromatic diazo thio ethers, in that the arylazo aryl sulfides on decomposition in the latex give rise to thiophenols which act as regulators for the polymer chains in the emulsion polymerization, whereas the arylazo aryl sulfones of the present invention do not. Because of this, the arylazo aryl sulfides, as distinguished from the arylazo aryl sulfones of the present invention, combine the properties of a catalyst and a regulator, which is undesirable where the polymerization is to be regulated solely by regulators specifically added for the purpose.

The aryl groups in the arylazo aryl sulfones of the present invention may have benzene nuclei or condensed benzene (e. g. naphthalene) nuclei, and may be unsubstituted or have substituents which are essentially unreactive in character and which therefore do not interfere with the polymerization, such as alkyl, alkoxy, halo and sulfo substituents as in alkaryl (e. g. o-tolyl, and 2,4-dimethylphenyl), alkoxyaryl (e. g. 4-methoxyphenyl and 4-ethoxyphenyl), haloaryl (e. g. 4-chlorophenyl and 4-bromophenyl), and sulfoaryl (e. g. 4-sulfophenyl) radicals. The term "aryl" as used herein, where it is not otherwise defined, is used in its accepted meaning as an organic radical derived from an aromatic hydrocarbon by the removal of one hydrogen atom, e. g. phenyl, naphthyl, tolyl, dimethyl phenyl.

The arylazo aryl sulfones of the present invention may be prepared by the reaction of a substituted or unsubstituted aryl diazonium halide (prepared by diazotizing an aromatic amine) with the alkali-metal (usually sodium) salt of a substituted or unsubstituted aryl sulfinic acid according to the equation:

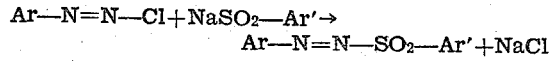

Ar—N=N—Cl+NaSO$_2$—Ar' →
 Ar—N=N—SO$_2$—Ar'+NaCl

Illustrative examples of the detailed preparation of a representative number of arylazo aryl sulfones that are used as catalysts in the manufacture of synthetic rubber latex according to the present invention are set forth in Examples I to XIII below.

EXAMPLE I

2,4-dimethylphenylazo p-tolyl sulfone

Six and one tenth g. (0.05 mol) of 1-amino-2,4-dimethyl benzene was diazotized at 0–10° C. in aqueous hydrochloric acid solution with a slight excess of sodium nitrite. At the end of one hour excess nitrite was destroyed by addition of sulfamic acid. The resulting solution of 2,4-dimethylphenyl diazonium chloride was then added slowly with vigorous mechanical stirring to a cold solution of 15 g. of the sodium salt of p-tolyl sulfinic acid (dihydrate) and 10 g. of sodium carbonate in 200 ml. of water. The yellow suspension was stirred for a few minutes, then placed in the refrigerator over night. The next day the solid was filtered off and washed with water. It was then dissolved in 100 ml. of diethyl ether, the solution was decanted from a little water and dried for a few minutes over anhydrous magnesium sulfate. The solution was filtered and 100 ml. of petroleum ether (B. P. 30–60° C.) was added. Yellow crystals began to separate at once. The mixture was placed in the refrigerator until thoroughly cooled; the product was then filtered off and washed with petroleum ether. The yield of crude product is quantitative. The melting point of the purified 2,4-dimethylphenylazo p-tolyl sulfone was 83–83.5° C.

EXAMPLE II

Phenylazo p-tolyl sulfone

Four and six-tenths g. (0.05 mol) of aniline was diazotized at 0–10° C. in aqueous hydrochloric acid solution with a slight excess of sodium nitrite. At the end of one hour excess nitrite was destroyed by addition of sulfamic acid. The resulting solution of benzene diazonium chloride was neutralized to Congo red paper with sodium acetate and added slowly with vigorous mechanical stirring to a cold solution of 9.7 g. of the sodium salt of p-tolyl sulfinic acid (dihydrate) in 200 ml. of water. The resulting yellow suspension was stirred for a few minutes after which the solid was filtered off and washed with water. A sample of the product was dissolved in 25 ml. of ether. The solution was dried with magnesium sulfate and an equal volume of petroleum ether added. Blunt yellow needles began to separate at once. The mixture was placed in the refrigerator until thoroughly cooled; the product was then filtered off and washed with petroleum ether. The melting point of the purified phenylazo p-tolyl sulfone was 90–92° C.

EXAMPLE III

*4-methoxyphenylazo p-tolyl sulfone*

Three and one tenth g. (0.025 mol.) of 1-amino-4-methoxy benzene was diazotized at 0–10° C. in aqueous hydrochloric acid with a slight excess of sodium nitrite. At the end of one hour excess nitrite was destroyed by addition of sulfamic acid. The resulting solution of 4-methoxy benzene diazonium chloride was then neutralized to Congo red paper with potassium acetate and added with vigorous mechanical stirring to a cold solution of 5.3 g. of the sodium salt of p-tolyl sulfinic acid (dihydrate) in 100 ml. of water. After about two hours in the ice bath the yellow solid was filtered off and washed with water. A sample of the product was dissolved in 25 ml. of ether. The solution was dried with magnesium sulfate and an equal volume of petroleum ether added. The mixture was placed in the refrigerator until thoroughly cooled; the yellow crystals which separated were then filtered off and washed with petroleum ether. The melting point of the purified 4-methoxyphenylazo p-tolyl sulfone was 94–95° C.

EXAMPLE IV

*1-naphthylazo p-tolyl sulfone*

Five g. (0.035 mol) of alpha naphthyl amine was diazotized at 0–10° C. in aqueous hydrochloric acid solution with a slight excess of sodium nitrite. At the end of one hour excess nitrite was destroyed by addition of sulfamic acid. The resulting solution of alpha naphthalene diazonium chloride was neutralized to Congo red paper with sodium acetate and added slowly with vigorous mechanical stirring to a cold solution of 8.0 g. (0.037 mol) of the sodium salt of p-tolyl sulfinic acid (dihydrate) in 200 ml. of water. The resulting yellow suspension was stirred for a few minutes; then the yellow solid was filtered off and washed with water. The product was purified by solution in benzene and precipitation with petroleum ether. The melting point of the purified 1-naphthylazo p-tolyl sulfone was 102–103° C.

EXAMPLE V

*2-naphthylazo p-tolyl sulfone*

Five g. (0.035 mol) of beta naphthyl amine was diazotized at 0–10° C. in aqueous hydrochloric acid solution with a slight excess of sodium nitrite. At the end of one hour excess nitrite was destroyed by addition of sulfamic acid. The resulting solution of beta naphthalene diazonium chloride was neutralized to Congo red paper with sodium acetate and added slowly with vigorous mechanical stirring to a cold solution of 8.0 g. (0.037 mol) of the sodium salt of p-tolyl sulfinic acid (dihydrate) in 200 ml. of water. The resulting suspension was stirred for a few minutes, then the yellow solid was filtered off and washed with water. The product was purified by solution in benzene and precipitation with petroleum ether. The melting point of the purified 2-naphthylazo p-tolyl sulfone was 112–114° C.

EXAMPLE VI

*4-sulfophenylazo p-tolyl sulfone sodium salt*

Four and three tenths g. (0.025 mol) of sulfanilic acid was dissolved in a solution of 1.8 g. of sodium carbonate in 70 ml. of water. A solution of 1.72 g. of sodium nitrite in a little water was then added. The resulting solution was cooled and poured into a mixture of 6 ml. of hydrochloric acid and 50 g. of ice. At the end of one half hour excess nitrite was destroyed with sulfamic acid and the suspension of diazonium salt was poured into a cold solution of 5.45 g. (0.025 mol) of the sodium salt of p-tolyl sulfinic acid (dihydrate) in 100 ml. of water plus 10 ml. of 10% sodium hydroxide solution. The clear solution was stirred for a few minutes, acidified to Congo red paper with hydrochloric acid and 20 g. of sodium chloride was added to salt out the product. The precipitated solid was filtered off and washed with petroleum ether. The purified yellow crystals did not melt but decomposed on strong heating, leaving a non-volatile residue.

EXAMPLE VII

*Phenylazo 2-naphthyl sulfone*

Two g. (0.02 mol) of aniline was diazotized at 0–10° C. in aqueous hydrochloric acid solution with a slight excess of sodium nitrite. At the end of one hour excess nitrite was destroyed by addition of sulfamic acid. The resulting solution of benzene diazonium chloride was neutralized to Congo red paper with sodium acetate, and to it was added with vigorous stirring a solution of 4.3 g. (0.02 mol) of the sodium salt of beta naphthalene sulfinic acid in 100 ml. of water. A yellow oil separated at once. The mixture was stirred in a bath for one hour, then stored in the refrigerator for an hour. The water was decanted from the oil and the latter was taken up in diethyl ether. It crystallized at once on contact with the ether. The solution was dried over magnesium sulfate, filtered and cooled to −70° C. The bright yellow crystals were filtered off and dried under vacuum. The melting point of the purified phenylazo 2-naphthyl sulfone was 86–87° C.

EXAMPLE VIII

*4-methoxyphenylazo 2-naphthyl sulfone*

Three g. (0.024 mol) of 4-methoxy-1-amino benzene was diazotized at 0–10° C. in aqueous hydrochloric acid solution with a slight excess of sodium nitrite. At the end of one hour excess nitrite was destroyed by addition of sulfamic acid. The resulting solution of 4-methoxy benzene diazonium chloride was neutralized to Congo red paper with sodium acetate and to it was added with vigorous stirring a solution of 5.2 g. (0.024 mol) of the sodium salt of beta naphthalene sulfinic acid in 100 ml. of water. After one hour of stirring in the ice bath the semi-solid product was filtered off. It crystallized on treatment with diethyl ether. The crystals were dissolved in diethyl ether; the solution was dried and filtered. The dry solution was diluted with ¼ its volume of petroleum ether and cooled to −70° C. The yellow crystals were filtered off and dried under vacuum. The melting point of the purified 4- methoxyphenylazo 2-naphthyl sulfone was 94 to 95° C.

Examples of other arylazo aryl sulfones that may be used as catalysts in the emulsion polymerization of synthetic rubbers and that are made similarly to the above by reacting the selected aryl diazonium chloride with the sodium salt of the selected aryl sulfinic acid are phenylazo phenyl sulfone, o-tolylazo phenyl sulfone, p-tolylazo phenyl sulfone, o-methoxy phenylazo phenyl sulfone, p-methoxy phenylazo phenyl sulfone, 2,4-dimethyl phenylazo phenyl sulfone, 2,5-dimethyl phenylazo phenyl sulfone, o-chlorophenylazo phenyl sulfone, m-chlorophenylazo phenyl sulfone, p-chlorophenylazo phenyl sulfone, o-phenyl phenylazo phenyl sulfone, p-phenyl phenylazo phenyl sulfone, 2-sulfo-phenylazo phenyl sulfone-sodium salt, phenylazo o-tolyl sulfone, phenylazo 2,5-dimethyl phenyl sulfone, phenylazo 2-chloro phenyl sulfone, 4-sulfo 1-naphthylazo phenyl sulfone-sodium salt, 5-sulfo 1-naphthylazo phenyl sulfone-sodium salt, 6-sulfo 2-naphthylazo phenyl sulfone-sodium salt.

The arylazo aryl sulfone catalysts may be used in the preparation of various synthetic rubber latices made by the emulsion polymerization of polymerizable material by incorporating the catalyst in the aqueous emulsion of polymerizable monomers in the usual manner before polymerization. The amount of arylazo aryl sulfone used may be from 0.01 to 0.5 part by weight per 100 parts of polymerizable monomers in the emulsion. The polymerizable monomers may be emulsified in the water by any of the emulsifying agents usually employed, such as sodium soaps of higher fatty acids and rosin acids, or other surface-active agents (e. g. alkali-metal salts of alkylated naphthalene sulfonic acid or fatty alcohol sulfates), and the temperature for the polymerization may be any desired temperature as from 10 to 65° C. The emulsion of polymerizable monomers may contain a conventional regulator such as a higher alkyl mercaptan or an aromatic mercaptan. The polymerizable monomers for the preparation of the synthetic rubber may be one or a mixture of butadiene-1,3-hydrocarbons, for example, butadiene -1,3,2 - methyl-butadiene -1,3 (isoprene), piperylene, 2,3-dimethylbutadiene-1,3. The polymerizable material as is known may be a mixture of one or more of such butadiene-1,3 hydrocarbons with one or more other polymerizable compounds which are capable of forming rubbery copolymers with butadiene-1,3 hydrocarbons, for example, up to 70% of such mixture of one or more compounds which contain a single CH=C< group where at least one of the disconnected valences is attached to an electro-negative group, that is, a group which substantially increases the electrical dissymmetry or polar character of the molecule, such group being other than H or CH₃. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylamide; methyl vinyl ether; methyl vinyl ketone; vinylidene chloride.

Illustrative examples of the detailed preparation of synthetic rubbers with a representative number of arylazo aryl sulfones as catalysts according to the present invention are set forth in Examples IX to XIII, below, all parts referred to therein being by weight:

EXAMPLE IX

The following formula was loaded into four 24 ounce crown cap bottles:

| | Parts |
|---|---|
| Butadiene | 72 |
| Styrene | 28 |
| 2,4-dimethylphenylazo p-tolyl sulfone | 0.06 |
| Soap | 5 |
| Regulator | 0.35 |
| Sodium sulfate | 0.3 |
| Water | 180 |

The soap (emulsifier) and regulator in the above formulation and in the following examples were those conventionally used in synthetic rubber manufacture, viz., sodium soap of dehydrogenated rosin acids, and dodecyl mercaptan regulator, respectively. The sodium sulfate was included to decrease the viscosity of the latex.

The loaded bottles were placed on a wheel polymerizer at 45° C. and agitated for 23 hours. At the end of that time 82% of the monomers had been converted to polymer. The latices were blended and the polymer isolated by known coagulation with sodium chloride and dilute sulfuric acid.

The polymer was compounded in a tread stock and cured for 60 minutes at 45 pounds of steam pressure. The thus cured stock, and a cured stock of similar composition prepared from a synthetic rubber made with potassium persulfate catalyst (GR-S Control), had the following properties:

| | Present Invention | GR-S Control |
|---|---|---|
| | Lb./sq. in. | Lb./sq. in. |
| Modulus at 300% elongation | 1,180 | 1,100 |
| Modulus at 500% elongation | 2,540 | 2,190 |
| Tensile | 3,360 | 3,210 |
| Aged tensile (48 hrs. at 212° F.) | 2,900 | 2,620 |
| Tensile at 205° F | 1,590 | 1,460 |
| Torsional Hysteresis at 280° F | 2.06 | 2.26 |

EXAMPLE X

The following formula was loaded into a 24 ounce crown cap bottle:

| | |
|---|---|
| Butadiene | 75 |
| Styrene | 25 |
| Phenylazo p-tolyl sulfone | 0.05 |
| Soap | 5.0 |
| Regulator | 0.35 |
| Sodium sulfate | 0.30 |
| Water | 180 |

The loaded bottle was placed on a wheel polymerizer in a water bath at 45° and agitated for 29 hours. At the end of this time 82% of the monomers had been converted to rubbery polymer which was isolated from the latex by known methods.

EXAMPLE XI

The following formula was loaded into a 24 ounce crown cap bottle:

| | |
|---|---|
| Butadiene | 75 |
| Styrene | 25 |
| 4-methoxyphenylazo p-tolyl sulfone | 0.05 |
| Soap | 5.0 |
| Regulator | 0.35 |
| Sodium sulfate | 0.30 |
| Water | 180 |

The loaded bottle was placed on a wheel polymerizer in a water bath at 45° and agitated for 29 hours. At the end of this time 77% of the monomers had been converted to rubbery polymer which was isolated from the latex by known methods.

EXAMPLE XII

The following formula was loaded into a 24 ounce crown cap bottle:

| | |
|---|---|
| Butadiene | 75 |
| Styrene | 25 |
| 4-methoxyphenylazo 2-naphthyl sulfone | 0.05 |
| Soap | 5 |
| Regular | 0.35 |
| Sodium sulfate | 0.30 |
| Water | 180 |

The loaded bottle was placed on a wheel polymerizer in a water bath at 45° and agitated for 29 hours. At the end of this time 77% of the monomers had been converted to rubbery polymer which was isolated from the latex by known methods.

EXAMPLE XIII

The following formula was loaded into a 24 ounce crown cap bottle:

| | |
|---|---|
| Butadiene | 75 |
| Styrene | 25 |
| 4-sulfophenylazo p-tolyl sulfone, sodium salt | 0.30 |
| Soap | 5 |
| Regulator | 0.35 |
| Sodium sulfate | 0.30 |
| Water | 180 |

The loaded bottle was placed on a wheel polymerizer in a water bath at 45° and agitated for 23 hours. At the end of this time 57% of the monomers had been converted to rubbery polymer which was isolated from the latex by known means.

Examples IX to XIII above show for convenience the preparation of butadiene-styrene synthetic rubbers, which are the commonest commercial type of synthetic rubber. Similar results are obtained when using the arylazo aryl sulfone catalyzers of the present invention in the polymerization of other types of synthetic rubbers, e. g., in the emulsion polymerization polyisoprene, and of polybutadiene, and in the aqueous emulsion polymerization of monomer mixtures, such as: 75 parts of butadiene-1,3 and 25 parts of methyl acrylate; 35 parts of butadiene-1,3, 35 parts of isoprene and 30 parts of methyl acrylate; 70 parts of butadiene-1,3, 25 parts of styrene and 5 parts of methyl methacrylate; 35 parts of butadiene-1,3, 35 parts of isoprene, 25 parts of styrene and 5 parts of methyl methacrylate.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight per 100 parts by weight of polymerizable monomeric material of a sulfone selected from the group consisting of unsubstituted arylazo aryl sulfones and arylazo aryl sulfones in which at least one of the aryl groups is substituted by material selected from the group consisting of alkyl, alkoxy, halo and sulfo substituents.

2. In a process of polymerizing in aqueous emulsion a mixture of a butadiene-1,3 hydrocarbon and a compound which contains a single $CH_2=C<$ group and is copolymerizable therewith, the step of carrying out the polymerization in the presence of 0.01 to 0.5 part by weight per 100 parts by weight of polymerizable monomeric material of a sulfone selected from the group consisting of unsubstituted arylazo aryl sulfones and arylazo aryl sulfones in which at least one of the aryl groups is substituted by material selected from the group consisting of alkyl, alkoxy, halo and sulfo substituents.

3. In a process of polymerizing in aqueous emulsion a mixture of butadiene-1,3 and styrene, the step of carrying out the polymerization in the presence of 0.01 to 0.5 part by weight per 100 parts by weight of polymerizable monomeric material of a sulfone selected from the group consisting of unsubstituted arylazo aryl sulfones and arylazo aryl sulfones in which at least one of the aryl groups is substituted by material selected from the group consisting of alkyl, alkoxy, halo and sulfo substituents.

4. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight of a phenylazo aryl sulfone per 100 parts by weight of polymerizable monomeric material.

5. In a process of polymerizing in aqueous emulsion a mixture of butadiene-1,3 and styrene, the step of carrying out the polymerization in the presence of 0.01 to 0.5 part by weight of a phenylazo aryl sulfone per 100 parts by weight of polymerizable monomeric material.

6. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight of a phenylazo p-tolyl sulfone per 100 parts by weight of polymerizable monomeric material.

7. In a process of polymerizing in aqueous emulsion a mixture of butadiene-1,3 and styrene, the step of carrying out the polymerization in the presence of 0.01 to 0.5 part by weight of a phenylazo p-tolyl sulfone per 100 parts by weight of polymerizable monomeric material.

8. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight of a sulfophenylazo aryl sulfone per 100 parts by weight of polymerizable monomeric material.

9. In a process of polymerizing in aqueous emulsion a mixture of butadiene-1,3 and styrene, the step of carrying out the polymerization in the presence of 0.01 to 0.5 part by weight of a sulfophenylazo aryl sulfone per 100 parts by weight of polymerizable monomeric material.

10. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight of an alkylphenylazo aryl sulfone per 100 parts by weight of polymerizable monomeric material.

11. In a process of polymerizing in aqueous emulsion a mixture of butadiene-1,3 and styrene, the step of carrying out the polymerization in the presence of 0.01 to 0.5 part by weight of an alkylphenylazo aryl sulfone per 100 parts by weight of polymerizable monomeric material.

12. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight of an alkoxyphenylazo aryl sulfone per 100 parts by weight of polymerizable monomeric material.

13. In a process of polymerizing in aqueous emulsion a mixture of butadiene-1,3 and styrene, the step of carrying out the polymerization in the presence of 0.01 to 0.5 part by weight of an alkoxyphenylazo aryl sulfone per 100 parts by weight of polymerizable monomeric material.

14. In a process of polymerizing in aqueous emulsion material selected from the group consisting of butadiene-1,3 hydrocarbons and mixtures of butadiene-1,3 hydrocarbons with compounds which contain a single $CH_2=C<$ group and are copolymerizable therewith, the step of carrying out the polymerization in the presence of 0.01 to 0.5 part by weight of a halophenylazo aryl sulfone per 100 parts by weight of polymerizable monomeric material.

15. In a process of polymerizing in aqueous emulsion a mixture of butadiene-1,3 and styrene, the step of carrying out the polymerization in the presence of 0.01 to 0.5 part by weight of a halophenylazo aryl sulfone per 100 parts by weight of polymerizable monomeric material.

ROBERT W. BROWN.

No references cited.